E. A. LE BEAU & E. G. BUSSE.
SIDE BEARING FOR RAILWAY CARS.
APPLICATION FILED APR. 15, 1912.

1,166,058.

Patented Dec. 28, 1915.
2 SHEETS—SHEET 1.

Witnesses:—

Inventors:
Ernest A. Le Beau
and Edwin G. Busse
Peirce, Fisher & Clapp
Attys.

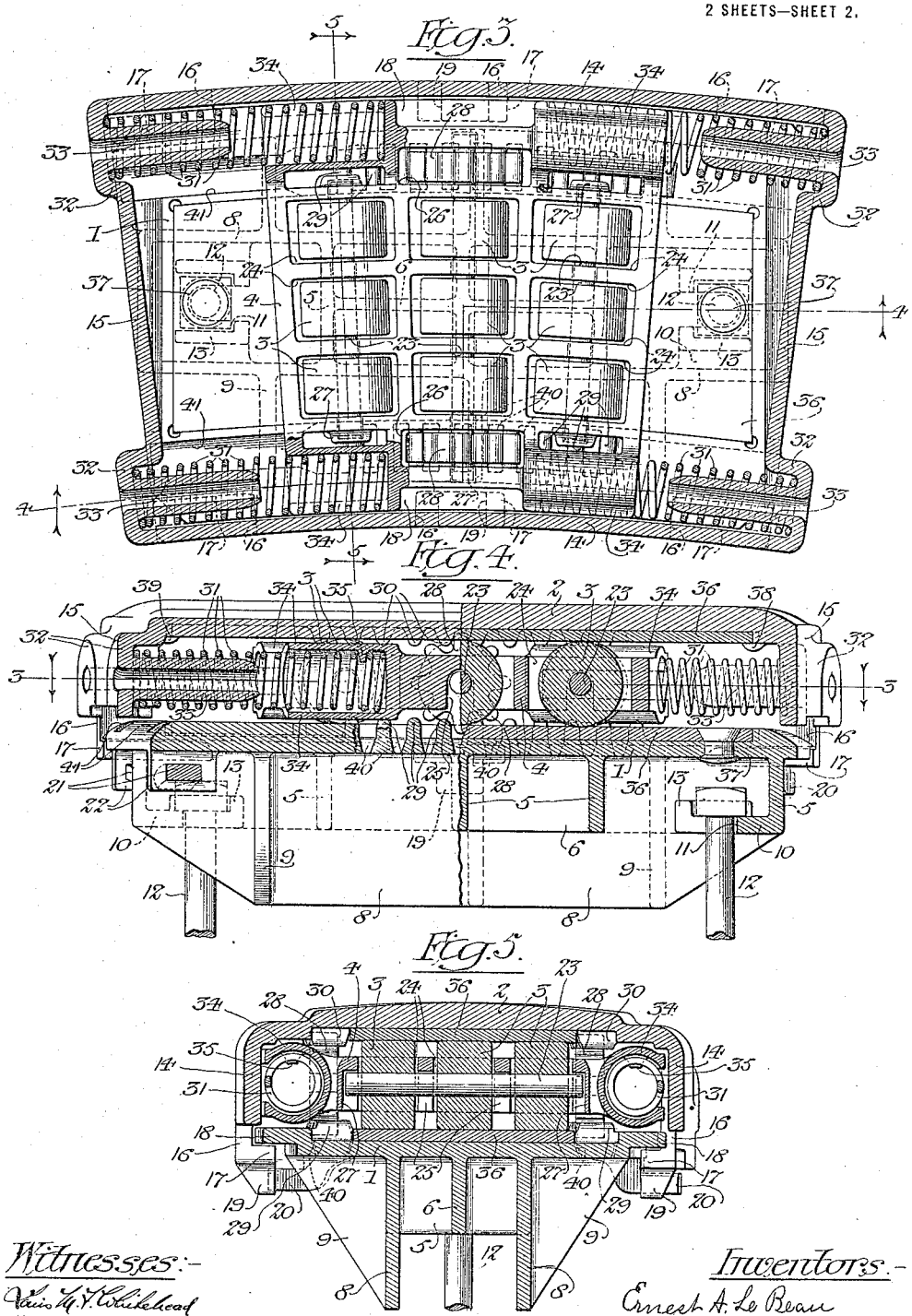

UNITED STATES PATENT OFFICE.

ERNEST A. LE BEAU AND EDWIN G. BUSSE, OF CHICAGO, ILLINOIS, ASSIGNORS TO CHICAGO RAILWAY EQUIPMENT COMPANY, OF CHICAGO, ILLINOIS, A CORPORATION.

SIDE BEARING FOR RAILWAY-CARS.

1,166,058.   Specification of Letters Patent.   Patented Dec. 28, 1915.

Application filed April 15, 1912. Serial No. 690,979.

*To all whom it may concern:*

Be it known that we, ERNEST A. LE BEAU and EDWIN G. BUSSE, citizens of the United States, and residents of Chicago, in the county of Cook and State of Illinois, have invented certain new and useful Improvements in Side Bearings for Railway-Cars, of which the following is a full, clear, and exact description.

The invention relates to anti-friction side bearings for railway cars of the type having a lower base plate and an upper, movable cover or bearing plate with interposed rollers or the like in contact with said plates, the upper cover or bearing plate being arranged to be engaged by the ends of the body bolster of the car.

The present invention seeks to provide an improved construction which can be readily assembled and in which improved means are provided for maintaining the parts in proper relation and for centering the bearing or cover plate and the interposed anti-friction rollers when the load is removed.

The invention consists in the features of improvement hereinafter set forth, illustrated in the preferred form in the accompanying drawings and more particularly pointed out in the appended claims.

Figure 1:
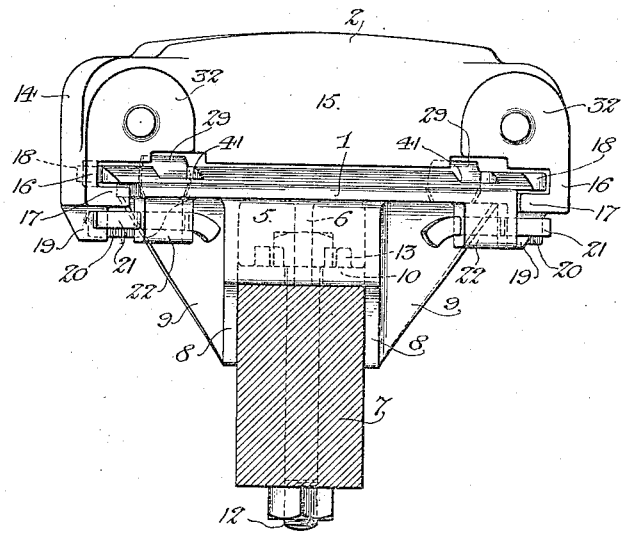
Figure 2:
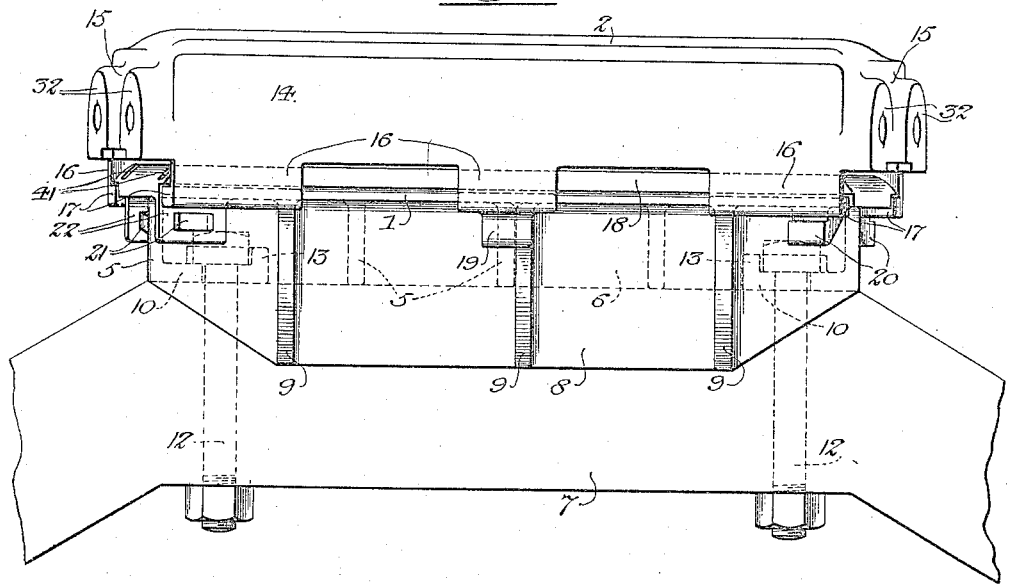

In the drawings, Figure 1 is an end view of the improved side bearing. Fig. 2 is a side elevation. Fig. 3 is a plan view with the cover plate and parts shown in section on the line 3—3 of Fig. 4. Fig. 4 is a longitudinal section on the line 4—4 of Fig. 3. Fig. 5 is a cross section on the line 5—5 of Fig. 3.

The improved side bearing comprises a base plate 1, a movable, upper bearing or cover plate 2 and an interposed anti-friction device comprising a set of rollers 3 arranged within a movable spacing frame 4. The base member or plate 1 is carried by the bolster or bolsters of the car truck. The preferred form illustrated is designed to be applied directly to the bearing yoke which is fixed to the ends of the bolsters of a six wheel truck. As shown, the lower side of the base plate is provided with depending transverse flanges 5 and a central longitudinal flange 6 which are adapted to rest upon the upper face of the central portion of the yoke 7. The base plate is also provided with depending side flanges 8 which overlap and snugly engage the sides of the yoke. The transverse flanges 5 extend between the side flanges 8 so that a strong construction is provided. The side flanges 8 are also preferably provided with triangular bracing flanges 9 extending between the outer faces of the side flanges and the outer side portions of the base plate. The end transverse flanges 5 are provided with horizontal portions 10 extending inwardly from their lower edges. These horizontal portions are provided with notches 11 to receive the headed ends of fastening bolts 12 by which the side bearing is secured to the yoke. Lips 13 extending around the edges of the notches 11 engage the heads of the bolts 12 and effectively prevent the displacement of the bearing. This arrangement obviates the necessity of employing a separate attaching plate which is usually secured to the yoke 7 and to which the side bearing is fastened.

The cover or bearing plate 2 is provided at its edges with depending side and end walls 14 and 15. The side walls 14 have an interlocking and guiding engagement with the side edges of the base plate 1 and these parts are properly curved so that the cover plate and anti-friction device will properly oscillate upon an arc struck from the king pin or center of oscillation of the truck. Preferably, as shown, each of the side walls 14 of the cover plate is provided with a series of three lugs 16 which depend from the lower edges thereof and which are provided with inturned lips 17 extending beneath the edge portions 18 of the base plate. Each of the center lugs 16 of the bearing or cover plate is provided with a depending stop lug 19 which, at one end of the movement of the cover plate, is arranged to engage a pair of coöperating lugs 20 on one end of the base plate. The stop lugs 20 are preferably cast integral with the base plate and extend downwardly and outwardly from the lower side portions thereof and these lugs, as most clearly shown in Figs. 2 and 5, are arranged below the edge portions 18 of the base plate and below the path of movement of the lips 16 on the cover plate but in position to engage the stop lugs 19 and arrest the travel of the cover plate at one end of its movement. At the opposite end of its movement, the stop lugs 19 are arranged to be engaged by the headed ends of two keys 21 which are inserted through a pair of key lugs 22 on the lower side of the base plate, the inner ends of the keys being bent over to hold them in position. The parts are assembled by sliding one of the plates longitudinally over the other with the lips 17 of the cover plate overlapping the edge portions 18 of the base plate. The keys 21 are not inserted until after the parts are assembled and the keys coöperate with the center lugs 19 of the cover plate to limit its movement in one direction and prevent its disengagement from the base plate.

In the particular form of side bearing shown, there are nine anti-friction rollers, and these rollers are preferably loosely mounted upon pintles or shafts 23. In the form shown, there are three of these shafts with three rollers on each shaft. The roller spacing frame 4 is supported upon the pintle shafts 23 and comprises a series of longitudinal and transverse ribs forming pockets 24 within which the rollers 3 are arranged. The longitudinal ribs of the spacing frame are provided with notches 25 which are open at their lower ends and are arranged to receive the pintle shafts 23. The center pintle shaft is longer than the end shaft and extends through two pockets or sapces 26, arranged at the central side portions of the frame. The longitudinally extending portion of the roller frame is provided with parts 27 which extend over the ends of the pintle shafts and prevent the endwise displacement thereof. The outer wall of the side central pockets 26 are provided with similar portions 27 which overlap the ends of the long central shaft to hold it against endwise movement.

The base plate, the upper bearing plate and the anti-friction device comprising the set of rollers and the roller frame, are held in proper relation by a centering device or member connected to the roller frame and engaging the base plate and the cover plate. This centering means preferably comprises a gear carried by the roller frame and engaging rack teeth formed upon the upper and lower plates. Preferably, two gears or pinions 28 are arranged within the central side pockets 26 of the roller frame and are loosely mounted upon the ends of the long center shaft 23. These gears mesh with two sets of rack teeth 29 and 30 formed upon the base and cover plates adjacent their side edges. To insure the proper movement of the roller frame in an arc about the center of oscillation of the truck, the rack teeth 29 and 30 and the pintle shafts 23 are arranged radially with respect to such center.

The rack teeth 29 and 30 preferably extend above and below the adjacent surfaces of the top and bottom plates and are arranged, as shown, outside of the bearing surfaces of these plates with which the rollers 3 are in rolling contact and preferably the bearing surfaces of the top and bottom plates are substantially in the same plane as the pitch line of the rack teeth.

The parts are restored to central position by opposed centering springs. Preferably, two pairs or sets of coiled springs 31 are employed, one pair being arranged at each side of the bearing between the side end portions of the roller spacing frame and the end walls 15 of the cover plate. The springs 31 are arranged within and closely adjacent the depending side walls 14 of the cover plate and the outer ends of the springs are arranged in outwardly projecting seating portions 32 formed upon the depending end walls 15 of the cover plate. These seating portions are preferably provided with centering studs 33 which project inwardly through the springs and which are cored out to lighten the structure.

The roller frame is substantially rectangular and is provided at each corner with a seat for the inner end of one of the springs. These seats on the roller frame are preferably in the form of cylindrical pockets 34 formed at the corners of the roller frame and open along their outer sides. The inner ends of the springs extend within the pockets and abut against the walls of the bottom or inner ends of the pockets. Preferably, the wall of each pocket is provided with a lug 35 which engages the coils at the inner end of the spring and locks it in position in the pocket.

When the bearing is in use upon a railway car, the engagement of the body bolster of the car with the bearing or cover plate will move the bearing or cover plate and the rollers and roller frame toward one end of the base plate as the car rounds a curve. Inasmuch as the cover plate travels twice as fast as the anti-friction device, the springs 31 at one end of the bearing will be compressed and, when the pressure is relieved, these springs will return the roller frame and rollers to central position with respect to the cover plate. At the same time, the gears 28 will coöperate with the rack teeth 29 and 30 to restore the anti-friction device and the cover plate to central position relatively to the base plate. It should be noted that the springs at one end of the bearing are idle when the springs at the opposite end are acting to restore the parts to central position. That is to say, the springs at one side of the bearing act to restore the parts when the bearing and anti-friction device are shifted in one direction, and the other set of springs act when the bearing has been shifted in the opposite direction.

It should be noted that the open sides of the cylindrical pocket 34 of the springs are flattened and are arranged adjacent the inner faces of the depending side flanges 14 of the cover plate, so that the roller frame and rollers cannot be improperly displaced in lateral direction. Normally, however, the roller frame is held out of engagement with the side walls 14 by the four springs 31 which are arranged between the corners of the cover plate and the corners of the roller frame. This arrangement of the springs holds the roller frame against twisting and thus reduces the friction and wear upon the parts. Furthermore, the gears 28 and the rack teeth with which they coöperate arranged at opposite sides of the roller frame aid in guiding the roller frame and cover plate and prevent these parts from twisting and grinding upon the base plate. It should also be noted that the bearing is not dependent upon the springs alone for positioning the parts, since the gears and rack teeth serve to positively regulate the relative position of the parts and the travel of the cover plate and of the roller frame. It is impossible for the anti-friction device to return to central position independently of the cover plate.

Preferably, the rollers 3 and gears 28 are loosely mounted upon the pintle shafts 23 and the pintle shafts are loosely arranged in the roller frame. Hence, when the load is applied to the bearing the solid rollers 3 between the base plate and cover plate take all the strain and there is no strain upon the gears or rack teeth which would otherwise tend to wear or break these parts, since, as stated, the gears are loosely mounted on the center pintle shaft 23 and are free to revolve independently of the rollers. The gears are in operation to center the parts only when the bearing is relieved from its load.

The bearing surfaces of the base and cover plates are preferably formed of hardened steel and for this purpose thin plates 36 are set within recesses formed in the inner faces of the base and cover plates between the rows of rack teeth 29 and 30. In the form shown, the lower wear plate 36 is secured to the base plate by rivets 37. The upper wear plate is held in place in the cover plate by lugs 38 and 39 which overlap the ends of the wear plate. One of the latter sets of lugs are bent to position after the wear plate has been inserted.

The entire upper surface of the base plate, with the exception of the rack teeth 29, lies in the plane of the upper face of the wear plate 36. The side flanges 14 of the cover plate are cut away between the lugs 16 (see Fig. 2) so that openings are formed through which air can circulate over the bearing face of the base plate to keep such surface free from cinders, dirt and the like. For the same purpose, the end walls 15 of the cover plate terminate slightly above the bearing surface of the base plate, as most clearly shown in Fig. 1. These end walls of the cover plate are, however, arranged closely adjacent the wearing surface and also assist in preventing the accumulation of cinders, dirt and the like upon the wear surface of the base plate. Any such material which would interfere with the proper operation of the bearing would be scraped off the wearing surface of the base plate by the lower edges of the end walls 15.

As a further aid in clearing the wearing surface of the base plate from dirt, openings 40 extend from the spaces between the rack teeth 29 through the base plate.

In order that the parts may be readily assembled, the base plate is provided at one end with grooves 41 in line with the rack teeth 29. The rollers and gears are placed in their proper position in the roller frame and the latter, together with the rollers and gears is then placed in the cover plate, all of these parts being inverted. The roller frame is held in its extreme forward position (or at the right hand end, as shown in the drawings) and the base plate is moved longitudinally to position with its edge portions 18 engaging the flanged lugs 16 of the cover plate. As the base is moved to position, the gears 28 on the roller frame pass through the slots 41 until they engage the rack teeth 29. The cover plate is then shifted to one extreme position and the springs 31 at one end inserted. The cover is then moved to its other extreme position and the springs at the opposite end inserted. Finally the keys 21 are inserted in the key lugs 22 and the ends of the keys bent, as shown in Fig. 1, to hold the parts in assembled condition.

The parts of the bearing can be readily disassembled by removing the keys for the purpose of making repairs.

The upper face of the bearing or cover plate 2 is preferably arched in lateral direction in order that the load may be carried at the central portion of the bearing directly above the supporting yoke 7.

It is obvious that numerous changes may be made in the details set forth without departure from the essentials of the invention as defined in the claims.

We claim as our invention:—

1. A side bearing for railway-cars comprising a base plate, a movable cover or bearing plate having depending side and end walls, said side walls being interlocked with said base plate, a movable anti-friction device interposed between said plates, springs housed within said cover plate and interposed directly between the end walls of said cover plate and said anti-friction device for centering said anti-friction device relatively to said cover plate, and a member connected to said anti-friction device and engaging said plates for centering said cover plate and anti-friction device relatively to said base plate, substantially as described.

2. A side bearing for railway cars comprising a base plate, a movable cover or bearing plate, anti-friction rollers interposed between said plates, a spacing frame for said rollers, springs interposed directly between said frame and the ends of said cover plate for centering said rollers relatively to said cover plate, and a member connected to said frame and engaging said plates for centering said cover plate, substantially as described.

3. A side bearing for railway cars comprising a base plate, a movable cover or bearing plate, anti-friction rollers interposed between said plates, a spacing frame for said rollers, centering springs for said rollers interposed directly between said frame and one of said plates, and a member, separate from said rollers mounted on said frame and engaging said plates for centering said cover plate, substantially as described.

4. A side bearing for railway cars comprising a base plate, a movable cover or bearing plate, anti-friction rollers interposed between said plates, a spacing frame for said rollers, centering springs interposed directly between said frame and one of said plates, and a gear separate from said rollers mounted on said frame, said plate having rack teeth engaged by said gear, substantially as described.

5. A side bearing for railway-cars comprising a base plate, a movable cover or bearing plate having depending side and end walls, said side walls being interlocked with said base plate, a movable anti-friction device interposed between said plates, springs housed within said cover plate and interposed directly between the end walls of said cover plate and said anti-friction device for centering said anti-friction device relatively to said cover plate, and a gear journaled on said anti-friction device, said base and cover plates having rack teeth engaged by said gear, substantially as described.

6. A side bearing for railway cars comprising a base plate, a movable cover or bearing plate provided with depending side walls in guiding and interlocking engagement with said base plate, a set of anti-friction rollers interposed between said plates, a spacing frame for said rollers, and gears mounted at opposite sides of said frame, said plates having rack teeth engaged by said gears and bearing surfaces between said rack teeth and substantially in the plane of the pitch line thereof, and one of said plates having longitudinal grooves in line with said rack teeth through which said gears pass in assembling the parts, substantially as described.

7. A side bearing for railway-cars comprising a base plate, a movable cover or bearing plate provided with depending side and end walls, said side walls having an interlocking and guiding engagement with said bearing plate, a set of anti-friction rollers interposed between said plates, a spacing frame for said rollers, centering springs interposed between the ends of said frame and of said cover plate, said plates having rack teeth at opposite sides extending above and below the adjacent surfaces of the plates, and gears on the opposite sides of said frame meshing with said rack teeth, substantially as described.

8. A side bearing for railway-cars comprising a base plate, a movable cover or bearing plate provided with depending side and end walls, said side walls having an interlocking and guiding engagement with said bearing plate, a set of anti-friction rollers interposed between said plates, a spacing frame for said rollers, centering springs interposed between the ends of said frame and of said cover plate, said plates having rack teeth at opposite sides extending above and below the adjacent surfaces of the plates, and gears on the opposite sides of said frame meshing with said rack teeth, said base plate having grooves at one end in line with said rack teeth through which said gears pass in assembling the parts, substantially as described.

9. A side bearing for railway-cars comprising a base plate, a movable cover or bearing plate having depending side and end walls, said side walls having an interlocking and guiding engagement with said base plate, a set of anti-friction rollers interposed between said plates, a spacing frame for said rollers, two sets of opposed coiled springs, one at each side of the bearing within said cover plate, said frame and said cover plate having seats for the ends of said springs, and gears loosely mounted at opposite sides of said frame, said plates having rack teeth engaged by said gears and bearing surfaces between and substantially in the plane of the pitch line of said rack teeth, substantially as described.

10. A side bearing for railway-cars comprising a base plate, a movable cover or bearing plate provided with depending side and end walls, said side walls having a guiding and interlocking engagement with said base plate, a set of anti-friction rollers interposed between said plates, a spacing frame engaging the pintles of said rollers, centering springs interposed between said frame and the end walls of said cover plate, said plates having bearing surfaces for said rollers and rack teeth at the sides of said surfaces, and gears mounted in said frame independently of said rollers and engaging said rack teeth, said springs and gears being housed within said cover plate, substantially as described.

11. A side bearing for railway-cars comprising a base plate, a movable bearing plate, anti-friction rollers interposed between said plates, a spacing frame for said rollers, a gear mounted on said spacing frame, said rollers and said gear being independently rotatable, rack teeth on said plates engaged by said gear, and opposed centering springs interposed between said frame and one of said plates, substantially as described.

ERNEST A. LE BEAU.
EDWIN G. BUSSE.

Witnesses:
HARRY L. CLAPP,
KATHARINE GERLACH.

Copies of this patent may be obtained for five cents each, by addressing the "Commissioner of Patents, Washington, D. C."